United States Patent [19]

Sorensen

[11] 4,338,786
[45] Jul. 13, 1982

[54] PREVENTION OF PERMANENT DEFORMATION OF ENCASED EXPANDITES

[75] Inventor: Jens O. Sorensen, Rancho Santa Fe, Calif.

[73] Assignee: Trade Finance International, Georgetown, Cayman Islands

[21] Appl. No.: 146,459

[22] Filed: May 5, 1980

[51] Int. Cl.³ .......................... F03C 5/00; F03G 7/04
[52] U.S. Cl. .................................. 60/531; 60/641.7; 53/434; 53/512
[58] Field of Search .................. 60/527, 530, 531; 53/403, 434, 79, 86, 512

[56] References Cited

U.S. PATENT DOCUMENTS

| | | | |
|---|---|---|---|
| 3,511,022 | 5/1970 | Finley et a. | 53/86 X |
| 4,104,883 | 8/1978 | Naef | 60/692 X |
| 4,164,111 | 8/1979 | Di Bernardo | 53/86 X |
| 4,214,449 | 7/1980 | Sorenson | 60/398 X |
| 4,241,558 | 12/1980 | Gidewall et al. | 53/512 X |

Primary Examiner—A. Michael Chambers
Attorney, Agent, or Firm—Brown & Martin

[57] ABSTRACT

A method and system for preventing permanent deformation during use and storage of encased expandites that constitute a thermodynamic working fluid for use in combination with a thermal fluid in a thermodynamic energy conversion system. The working fluid is made up of thousands of encased expandites, each of which includes a mass having a flexible covering encasing the mass for enabling rapid heat transfer between the mass and the thermal fluid, for enabling the encased expandite to maintain its integrity as a separate object when submerged in the thermal fluid, and for enabling the volume of the encased expandite to change in accordance with the characteristic interdependent relationship between changes in the density, temperature and pressure of the mass when the encased expandite is submerged in the thermal fluid. Each of the flexible coverings has a maximum containing volume prior to becoming permanently deformed. The encased expandites are maintained at a combination of temperature and pressure that is different than atmospheric conditions to thereby prevent the volume of the encased expandite mass from exceeding the maximum containing volume of the flexible cover.

20 Claims, 2 Drawing Figures

PREVENTION OF PERMANENT DEFORMATION OF ENCASED EXPANDITES

BACKGROUND OF THE INVENTION

The present invention is directed to a method and system for preventing permanent deformation during use and storage, of encased expandites that constitute a thermodynamic working fluid for use in combination with a thermal fluid in a thermodynamic energy conversion system.

The use of such a working fluid in thermodynamic energy conversion systems is described in applicant's U.S. Pat. No. 4,214,449 entitled "Thermal Energy Conversion System Utilizing Expandites" and U.S. patent application Ser. No. 123,491 filed Mar. 10, 1980 entitled "Thermodynamic Energy Conversion System and Method, Utilizing a Thermodynamic Working Fluid of Encased Expandites," the disclosures of which are incorporated herein by reference thereto.

The thermodynamic working fluid is made up of thousands of encased expandites, each of which includes a mass having a flexible covering encasing the mass for enabling rapid heat transfer between the mass and the thermal fluid, for enabling the encased expandite to maintain its integrity as a separate object when submerged in the thermal fluid, and for enabling the volume of the encased expandite to change in accordance with the characteristic interdependent relationship between changes in the density, temperature and pressure of the mass when the encased expandite is submerged in the thermal fluid. Each of the flexible coverings has a maximum containing volume prior to becoming permanently deformed.

Many thermodynamic energy conversion systems operate at super atmospheric pressures, whereby the encased expandites are adapted for expanding to not more than the maximum containing volume of the covering when in use at a predetermined super atmospheric pressure and a predetermined temperature. If such encased expandites were to be exposed to atmospheric conditions of temperature and pressure they would become permanently deformed, as a result of the volume of the expandite mass increasing to exceed the maximum containing volume of the covering. Permanent deformation may include such as rupture of the covering or permanently stretching the covering to change its shape.

SUMMARY OF THE INVENTION

In accordance with the present invention permanent deformation during use and storage, of encased expandites adapted for such use at super atmospheric pressures is prevented by maintaining the encased expandites at a combination of temperature and pressure that is different than atmospheric conditions to thereby prevent the volume of the encased expandite mass from exceeding the maximum containing volume of the flexible cover. To accomplish this purpose, it is necessary that the temperature and pressure be controlled during the manufacture and storage of the encased expandites. Storage includes the interval from the completion of manufacture until introduction as an operating working fluid in a thermodynamic energy conversion system, including intervals of transportation to the site of the system.

One feature of the present invention is to perform at least a portion of the manufacturing process under combinations of temperature and pressure that are different than atmospheric conditions to thereby prevent the volume of the encased expandite mass from exceeding the maximum containing volume of the covering material.

Various other features of the invention are discussed in connection with the description of the preferred embodiments.

DESCRIPTION OF THE PREFERRED EMBODIMENTS

The method and system of the present invention are described in relation to the manufacture and storage of different types of encased expandites.

Figure 1:
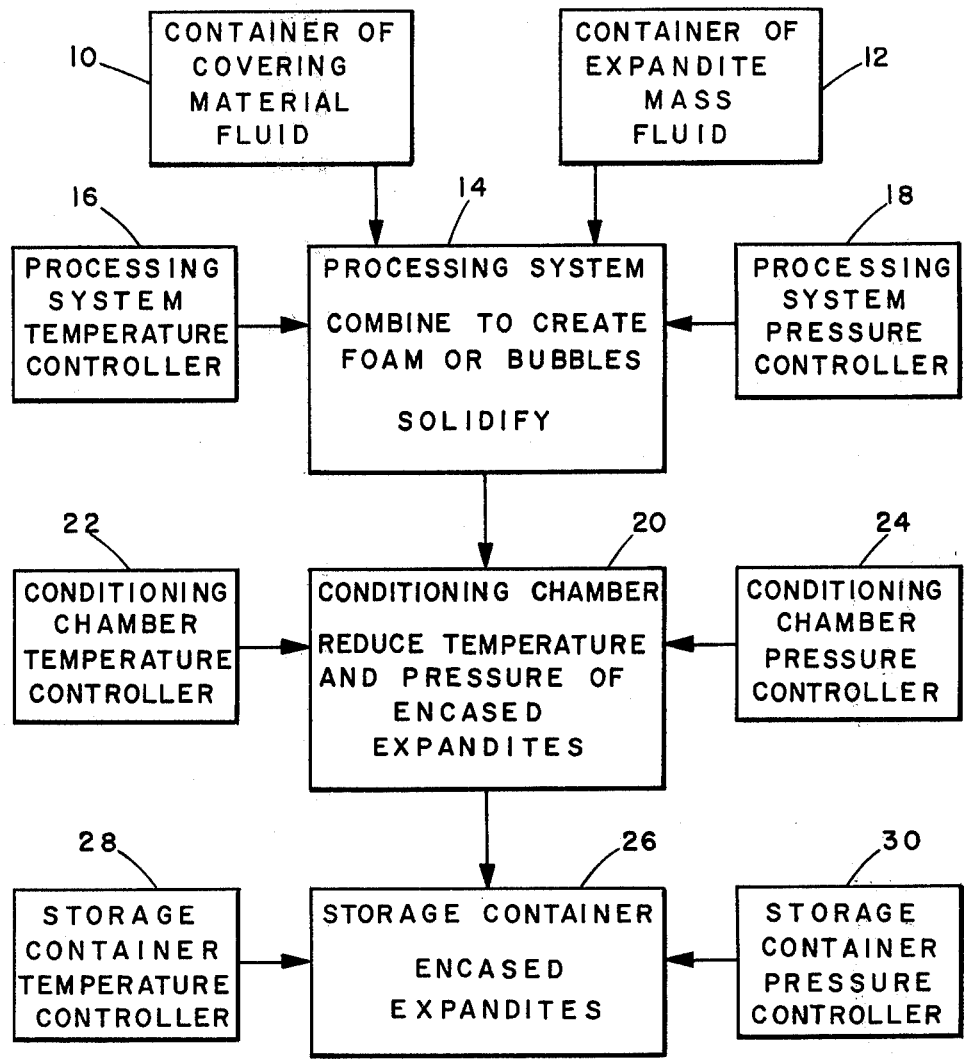
FIG. 1 is a schematic block diagram illustrating a preferred embodiment of the system of the present invention that is employed for the manufacture and storage of encased expandites when the flexible covering of the encased expandites is multicellular foam or unicellular bubbles.

For encased expandites wherein the flexible covering is a multicellular foam material encasing the expandite mass within the cells, the system illustrated in FIG. 1 is employed.

This system includes a container 10 that contains the flexible covering material in a fluid state; a container 12 that contains the expandite mass material in a fluid state; a processing system 14; a processing system temperature controller 16; a processing system pressure controller 18; a conditioning chamber 20; a conditioning chamber temperature controller 22; a conditioning chamber pressure controller 24, a storage container 26; a storage container temperature controller 28, and a storage container pressure controller 30. The following steps occur during the manufacture of the encased expandites. The material for the flexible covering is provided in a fluid state from the container 10 to the processing system 14. The expandite mass is provided in a fluid state from the container 12 to the processing system 14. The provided expandite mass is combined with the provided flexible covering material by the processing system 14 to create a multicellular foam; and the flexible covering material is solidified by the processing system 14 to contain the expandite mass within the cells of the foam. The processing system temperature controller 16 and the processing system pressure controller 18 control the temperature and pressure at which the foam is solidified.

One feature of the present invention is that the flexible covering material is solidified at a combination of temperature and pressure that is different than atmospheric conditions to thereby prevent the volume of the encased expandite mass from exceeding the maximum containing volume of the cells. For example, the foam is created at a temperature and pressure that are both in excess of atmospheric conditions. Then as the foam is cooled to effect solidification of the flexible covering material, the pressure is maintained above atmospheric pressure even though the pressure is reduced slightly from the higher pressure at which the foam was created.

The system illustrated in FIG. 1 also is employed when the individual encased expandite consists of a unicellular bubble of flexible covering material encasing the expandite mass. The following steps occur during the manufacture of the encased expandites. The material for the flexible covering is provided in a fluid state from the container 10 to the processing system 14. The expandite mass is provided in a fluid state from the container 12 to the processing system 14. The provided expandite mass is combined with the provided flexible covering material by the processing system 14 to create the unicellular bubbles; and the flexible covering material is solidified by the processing system 14 to contain the expandite mass within the bubbles. As in the method employed when the flexible covering is multicellular foam material, the flexible covering material is solidified at a combination of temperature and pressure that is different than atmospheric conditions to thereby prevent the volume of the encased expandite mass from exceeding the maximum containing volume of the bubbles. For example, the bubbles are created at a temperature and pressure that are both in excess of atmospheric conditions. Then as the bubbles are cooled to effect solidification of the flexible covering material, the pressure is maintained above atmospheric pressure even though the pressure is reduced slightly from the higher pressure at which the bubbles were created. The temperature and pressure at which the bubbles are solidified are controlled by the processing system temperature controller 16 and the processing system pressure controller 18.

The foam and the bubbles cannot be stored at atmospheric conditions of temperature and pressure because the volume of the expandite mass would exceed the maximum containing volume of the foam cells and the bubbles under such conditions. Also, it is not practical to store the encased expandites at the higher than atmospheric temperature at which they are manufactured. Thus the encased expandite are transferred to the conditioning chamber 20, where the temperature of the encased expandites is reduced for storage in response to operation of the conditioning chamber temperature controller 22, to a lower temperature than the expandite temperature at which the flexible covering material solidifies. As a result, the pressure at which the encased expandites are maintained in the conditioning chamber 20 also can be reduced in response to operation of the conditioning chamber pressure controller 24 as the encased expandites are cooled for storage following solidification of the flexible covering material.

The encased expandites are then transferred to the storage container 26, where the storage temperature is controlled by the storage container temperature controller 28, and the storage pressure is controlled by the storage container pressure controller 30. Storage density can be increased by substantially reducing the storage temperature and/or storage pressure of the encased expandites within the storage container 26.

Figure 2:
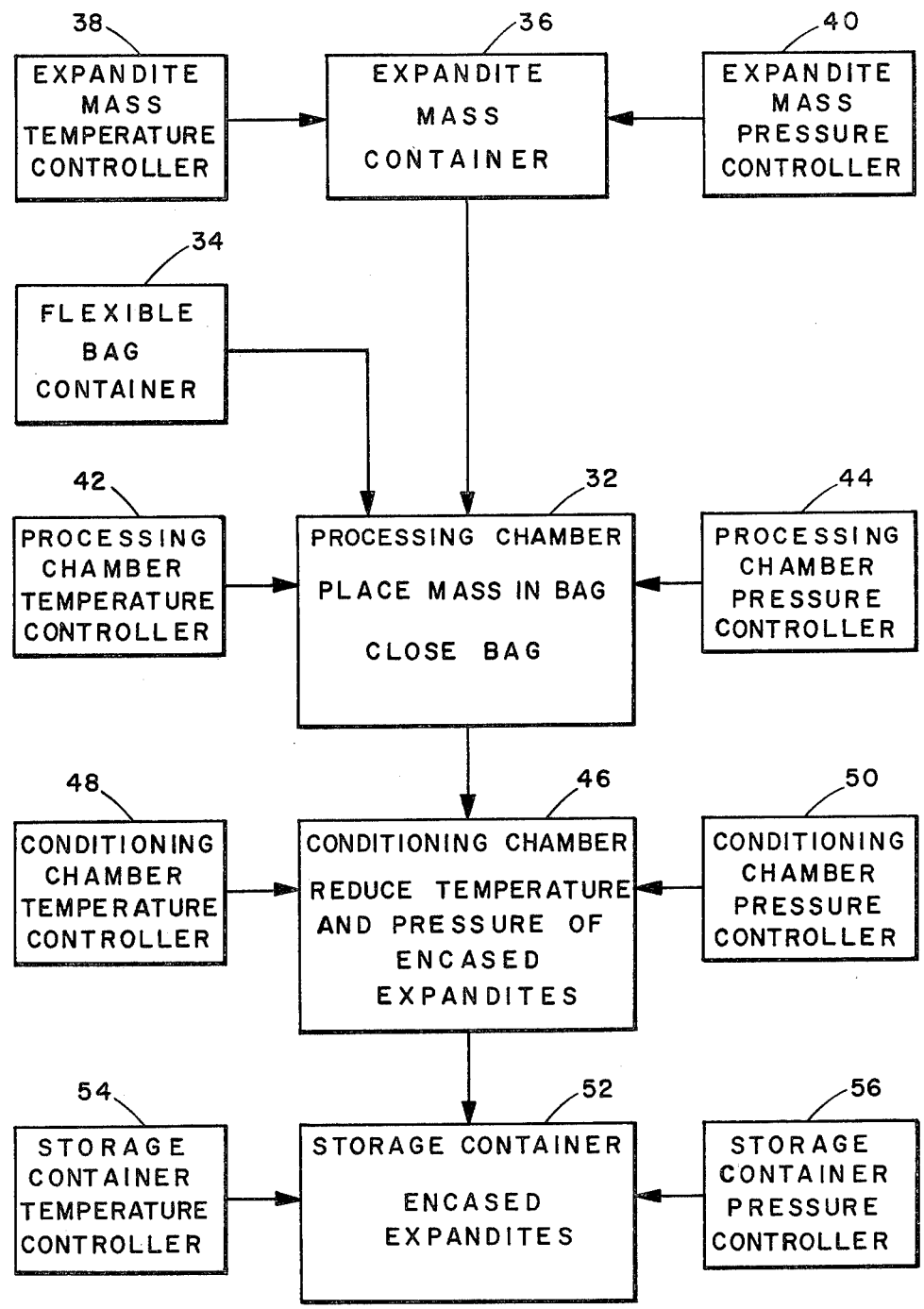
FIG. 2 is a schematic block diagram illustrating a preferred embodiment of the system of the present invention that is employed for the manufacture and storage of encased expandites when the flexible covering is a container, such as a bag which is closed after the expandite mass is placed therein.

For encased expandites in which the flexible covering is a preformed solid container, such as a plastic bag, the system illustrated in FIG. 2 can be employed for manufacture and storage of the encased expandites.

This system includes a processing chamber 32, a container 34 for holding flexible coverings, such as plastic bags, and for providing such bags in the processing chamber 34, and expandite mass container 36, an expandite mass temperature controller 38; an expandite mass pressure controller 40; a processing chamber temperature controller 42; a processing chamber pressure controller 44, a conditioning chamber 46, a conditioning chamber temperature controller 48; a conditioning chamber pressure controller 50; a storage container 52; a storage container temperature controller 54 and a storage container pressure controller 56.

The manufacturing method includes the following steps. The flexible covering, such as a plastic bag, is provided within the processing chamber 32 from the flexible bag container 34. The chamber 32 has a given combination of temperature and pressure that is controlled by the processing chamber temperature controller 42 and the processing chamber pressure controller 44. A measured quantity of the expandite mass is provided in the processing chamber 32 from the expandite mass container 36 and is placed in the flexible covering within the chamber 32. Still within, the processing chamber 32, the flexible covering is closed, such as by heat sealing the plastic bag to encase the expandite mass placed therein. The volume of expandite mass that is placed in the covering is significantly less than the maximum containing volume of the flexible covering to thereby prevent the volume of the encased expandite mass from expanding to more than the maximum containing volume of the covering.

The measured quantity of expandite mass can be provided for placement in the covering at a combination of temperature and pressure that causes the expandite mass to occupy significantly less volume than it would occupy if it were at the given combination of temperature and pressure of the processing chamber 32. The combination of temperature and pressure of the expandite mass when introduced into the processing chamber 32 is controlled by the expandite mass temperature controller 38 and the expandite mass pressure controller 40.

When the flexible covering is closed at a low pressure, such as at atmospheric pressure, it is preferable that the expandite mass be supplied in the processing chamber 32 at a low temperature in order for the volume of the expandite mass not to exceed the maximum containing volume of the flexible covering. During the step of closing the covering, heat may be added to the encased expandite, from the chamber such as when a plastic bag is heat sealed. The encased expandite also be heated by other sources, such as heat received from walls of the processing chamber 32. In these instances, it may be preferred that the expandite mass be supplied in a liquid or solid phase, so that some of the heat added to the expandite mass during closure of the covering is absorbed by a phase change in the expandite mass in order to prevent the expandite mass from exceeding the maximum containing volume of flexible covering.

It also is preferable that the processing chamber 32 be devoid of any fluid substance other than atmosphere of fluid expandite mass so that only expandite mass will be contained in the flexible covering.

Following the manufacture of the encased expandites, the encased expandites are transferred to the conditioning chamber 46. There, the temperature of the encased expandites is reduced for storage in response to operation of the conditioning chamber temperature controller 48 to a lower temperature than the expandite temperature at which the flexible covering is closed. As a result, the pressure at which the encased expandites are maintained in the conditioning chamber 46 also can be reduced in response to operation of the conditioning chamber pressure controller 50 as the encased expandites are cooled for storage following closing of the flexible coverings.

The encased expandites are then transferred to the storage container 52, where the storage temperature is controlled by the storage container temperature controller 54, and the storage pressure is controlled by the storage container pressure controller 56.

When the temperature of typical encased expandites is reduced at a constant pressure, the volume decreases. Thus the pressure at which the encased expandites are maintained can also be reduced since any increase in volume due to pressure reduction is offset by the volume reduction due to a decrease in temperature.

I claim:

1. A method for preventing permanent deformation during use and storage, of encased expandites that constitute a thermodynamic working fluid for use in combination with a thermal fluid in a thermodynamic energy conversion system wherein the working fluid is made up of thousands of encased expandites, each of which includes a mass having a flexible covering encasing the mass for enabling rapid heat transfer between the mass and the thermal fluid, for enabling the encased expandite to maintain its integrity as a separate object when submerged in the thermal fluid, and for enabling the volume of the encased expandite to change in accordance the characteristic interdependent relationship between changes in the density, temperature and pressure of the mass when the encased expandite is submerged in the thermal fluid, wherein each of the flexible coverings has a maximum containing volume prior to becoming permanently deformed, the method being characterized by the step of:
   (a) maintaining the encased expandites at a combination of temperature and pressure that is different than atmospheric conditions to thereby prevent the volume of the encased expandite mass from exceeding the maximum containing volume of the flexible cover.

2. A method according to claim 1, wherein the flexible covering is a multicellular foam material encasing the expandite mass within the cells; and wherein the following steps occur during the manufacture of the encased expandites;
   (b) providing the material for the flexible covering in a fluid state;
   (c) providing the expandite mass in a fluid state;
   (d) combining the provided expandite mass with the provided flexible covering material to create the multicellular foam; and
   (e) solidifying the flexible covering material to contain the expandite mass within the cells;
characterized by step (e) comprising the step of:
   (f) solidifying the flexible covering material at a combination of temperature and pressure that is different than atmospheric conditions to thereby prevent the volume of the encased expandite mass from exceeding the maximum containing volume of the cells.

3. A method according to claim 1, wherein an individual encased expandite consists of a unicellular bubble of flexible covering material encasing the expandite mass; and wherein the following steps occur during the manufacture of the encased expandites:
   (b) providing the material for the flexible covering in a fluid state;
   (c) providing the expandite mass in a fluid state;
   (d) combining the provided expandite mass with the provided flexible covering material to create the unicellular bubbles; and
   (e) solidifying the flexible covering material to contain the expandite mass within the bubbles;
characterized by step (e) comprising the step of:
   (f) solidifying the flexible covering material at a combination of temperature and pressure that is different than atmospheric conditions to thereby prevent the volume of the encased expandite mass from exceeding the maximum containing volume of the bubbles.

4. A method according to claim 2 or 3 characterized by step (a) comprising the steps of
   (g) storing the encased expandites at a lower temperature than the temperature at which the flexible covering material solidifies; and
   (h) reducing the pressure at which the encased expandites are maintained as the encased expandites are cooled for storage following solidification of the flexible covering material.

5. A method according to claim 1, wherein the following steps occur during the manufacture of the encased expandites:
   (b) providing the flexible covering within a chamber having a given combination of temperature and pressure;
   (c) providing a measured quantity of the expandite mass;
   (d) placing the provided measured quantity of expandite mass in the covering; and
   (e) closing the covering,
characterized by step (c) comprising the step of:
   (f) providing a volume of expandite mass that is significantly less than the maximum containing volume of the flexible covering to thereby prevent the volume of the encased expandite mass from exceeding the maximum containing volume of the covering.

6. A method according to claim 5, characterized by step (f) comprising the step of:
   (g) providing the measured quantity of expandite mass at a combination of temperature and pressure that causes the said quantity of expandite mass to occupy significantly less volume than it would occupy if it were at the given combination of temperature and pressure.

7. A method according to claim 5, characterized by step (f) comprising the step of
   (g) providing the expandite mass in a non-gaseous phase in order to provide said volume of expandite mass.

8. A method according to claim 5, 6 or 7 wherein the given combination of temperature and pressure are at atmospheric conditions.

9. A method according to claim 5 or 6, characterized by step (a) comprising the steps of:
   (h) storing the encased expandites at a lower temperature than the temperature of the expandites at which the flexible covering is closed; and
   (i) reducing the pressure at which the encased expandites are maintained as the encased expandites are cooled for storage following closing of the flexible covering.

10. A method according to claim 5, 6 or 7, characterized by step (b) comprising the step of:

(g) providing the flexible covering in a chamber that is devoid of any fluid substance other than an atmosphere of fluid expandite mass.

11. In a system for manufacturing encased expandites that constitute a thermodynamic working fluid for use in combination with a thermal fluid in a thermodynamic energy conversion system wherein the working fluid is made up of thousands of encased expandites, each of which includes a mass having a flexible covering encasing the mass for enabling rapid heat transfer between the mass and the thermal fluid, for enabling the encased expandite to maintain its integrity as a separate object when submerged in the thermal fluid and for enabling the volume of the encased expandite to change in accordance with the characteristic interdependent relationship between changes in the density, temperature and pressure of the mass when the encased expandite is submerged in the thermal fluid, wherein each of the flexible coverings has a maximum containing volume prior to becoming permanently deformed, a system for preventing permanent deformation of the encased expandites during use and storage, characterized by comprising, means for maintaining the encased expandites at a combination of temperature and pressure that is different than atmospheric conditions to thereby prevent the volume of the encased expandite mass from exceeding the maximum containing volume of the flexible cover.

12. A system according to claim 11, wherein the flexible covering is a multicellular foam material encasing the expandite mass within the cells; and wherein the manufacturing system comprises means for providing the material for the flexible covering in a fluid state;

means for providing the expandite mass in a fluid state;

means for combining the provided expandite mass with the provided flexible covering material to create the multicellular foam; and means for solidifying the flexible covering material to contain the expandite mass within the cells;

characterized by the solidifying means comprising means for solidifying the flexible covering material at a combination of temperature and pressure that is different than atmospheric conditions to thereby prevent the volume of the encased expandite mass from exceeding the maximum containing volume of the cells.

13. A system according to claim 11, wherein an individual encased expandite consists of a unicellular bubble of flexible covering material encasing the expandite mass; and wherein the manufacturing system comprises means for providing the material for the flexible covering in a fluid state;

means for providing the expandite mass in a fluid state;

means for combining the provided expandite mass with the provided flexible covering material to create the unicellular bubbles; and means for solidifying the flexible covering material to contain the expandite mass within the bubbles;

characterized by the solidifying means comprising:

means for solidifying the flexible covering material at a combination of temperature and pressure that is different than atmospheric conditions to thereby prevent the volume of the encased expandite mass from exceeding the maximum containing volume of the bubbles.

14. A system according to claim 12 or 13, characterized by the maintaining system comprising means for reducing the temperature of the encased expandites to a lower temperature than the temperature at which the flexible covering material solidifies; and means for reducing the pressure at which the encased expandites are maintained as the encased expandites are cooled following solidification of the flexible covering material.

15. A system according to claim 11, wherein the manufacturing system comprises a chamber means for providing the flexible covering within the chamber, means for providing a given combination of temperature and pressure within the chamber;

means for providing a measured quantity of the expandite mass within the chamber;

means for placing the provided measured quantity of expandite mass in the covering; and means for closing the covering, characterized by means for providing a volume of expandite mass that is significantly less than the maximum containing volume of the flexible covering to thereby prevent the volume of the encased expandite mass from exceeding the maximum containing volume of the covering.

16. A system according to claim 15, characterized by means for controlling the temperature and pressure at which the expandite mass is provided to thereby provide the measured quantity of expandite mass at a combination of temperature and pressure that causes the said quantity of expandite mass to occupy significantly less volume than it would occupy if it were at a given combination of temperature and pressure.

17. A system according to claim 15, characterized by means for controlling the temperature and pressure of the provided expandite mass to provide the expandite mass in a nongaseous phase for placement in the flexible covering.

18. A system according to claim 15, 16 or 17 wherein the given combination of temperature and pressure are at atmospheric conditions.

19. A system according to claim 15 or 16 characterized by the manufacturing system comprising:

means for reducing the temperature of the encased expandites to a lower temperature than the temperature of the expandites at which the flexible covering is closed; and means for reducing the pressure at which the encased expandites are maintained as the encased expandites are cooled following closing of the flexible covering.

20. A system according to claim 15, 16 or 17, characterized by the chamber being devoid of any fluid substance other than an atmosphere of fluid expandite mass when the expandite mass is placed in the flexible covering.

* * * * *